Oct. 3, 1967     M. D. DUDLEY     3,345,459
INFORMATION DISPLAY SYSTEMS UTILIZING
A METACHROMIC DISPLAY SCREEN
Filed May 27, 1965
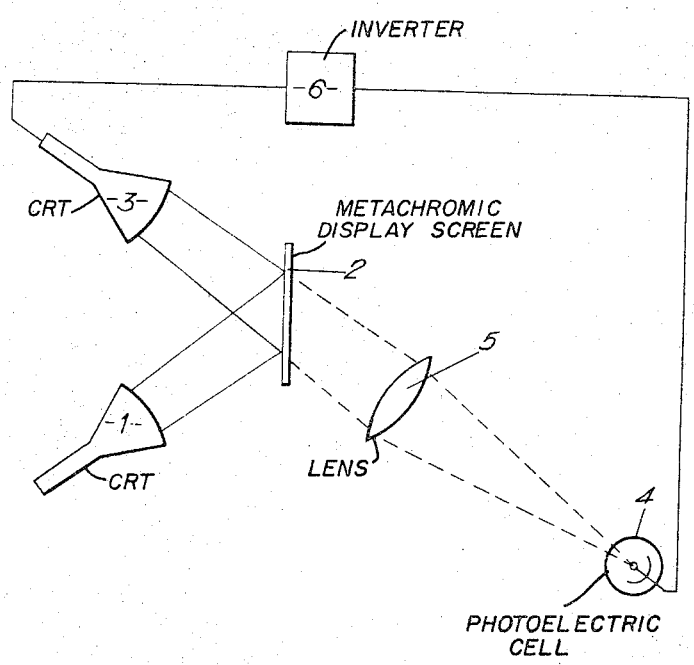
Inventor
M. D. DUDLEY
By Cameron, Kerkam & Sutton
Attorneys

United States Patent Office

3,345,459
Patented Oct. 3, 1967

3,345,459
INFORMATION DISPLAY SYSTEMS UTILIZING
A METACHROMIC DISPLAY SCREEN
Michael Duke Dudley, Wraysbury, Staines, Middlesex,
England, assignor to Ferranti, Limited Hollinwood,
Lancashire, England, a company of Great Britain and
Northern Ireland
Filed May 27, 1965, Ser. No. 459,210
Claims priority, application Great Britain, May 27, 1964,
21,847/64
4 Claims. (Cl. 178—7.5)

ABSTRACT OF THE DISCLOSURE

An apparatus for improving the persistence of a symbolic display on a screen of short-persistence metachromic material. The metachromic screen is disposed between the cathode-ray tube and light responsive device of a flying-spot scanner and the output of the scanner is used to modulate the intensity of the scanning beam in a manner which causes the opaque parts of the display to be rewritten.

---

This invention relates to improved information display systems of the type incorporating a screen of metachromic material.

A metachromic material is one which tends to become opaque under the influence of blue or ultra-violet light, the process being reversed under the influence of infra-red radiation, and heat.

Information display systems are known which use a screen of metachromic material on which to form an image which is then projected onto a viewing screen by normal optical projection means. In these systems the image may be projected onto the metachromic material from a transparency, or may be formed by the movement of a spot of light. It may also be formed by projecting the display from the screen of a cathode-ray tube.

The majority of these known systems are used to produce displays in the form of line or symbolic diagrams, and such displays will hereafter be referred to as "symbolic displays." The present invention is primarily concerned with the projection of symbolic displays onto a screen of short-persistence metachromic material.

For symbolic displays of this type it is necessary to use a short-persistence metachromic material in order that the information displayed may be changed rapidly when required. Hence, long-persistence metachromic materials are not suitable for this purpose. The preferred metachromic materials used are elementary or complex spiropyrans and their derivatives. One of the problems arising from the use of short-persistence metachromic materials in conjunction with a low intensity source of illumination is that the image produced on the metachromic screen is is often lacking in contrast and of very short-persistence. For example, when cathode-ray tubes having radial time-bases are used, such as the "plan position indicator" (P.P.I.) type, a low-intensity display is provided, and the scanning rate is relatively low, possibly of the order of one scan in five seconds. Even if the brightest of such displays is projected onto a metachromic screen, the image only persists for a fraction of such a scan cycle. Attempts have been made to increase the persistence by reducing the temperatures of the metachromic material, but this naturally leads to bulky and complex equipment. In these known systems the image produced on the metachromic screen has either to be viewed directly or projected by means of a source of visible light from which the red and blue ends of the spectrum have been removed. This in itself may lead to complications since normal heating by the light source may affect the persistence of the metachromic image.

The problem of persistence does not arise in information display systems in which the display is derived from a television-type raster, since the scanning rate is high enough to enable the metachromic image to be rewritten before any appreciable fading has occurred.

The object of the present invention is to provide an information display system of the type incorporating a short-persistence metachromic screen in which the effective persistence of the image on this screen is increased.

According to the present invention there is provided an information display system comprising a screen of metachromic material onto which is projected information in the form of an symbolic display from one or more sources, a flying-spot scanner capable of repeatedly scanning said image, and a control circuit operable to vary the intensity of the light beam emitted by the cathode-ray tube of said scanner in accordance with the density of each successive point of the image in such a way as to maintain the beam after transmission through the metachromic screen at a substantially constant intensity of illumination.

An embodiment of the invention will now be described, by way of example, with reference to the accompanying drawing which shows a schematic diagram of an information display system according to the invention.

Referring now to the drawing, the symbolic display on the screen of a blue-trace cathode-ray tube 1 which may be of the type having a radial time base and a low intensity display, is projected onto a screen 2 of metachromic material. A flying-spot scanner comprising a second blue-trace cathode-ray tube 3 and a photoelectric cell 4 is arranged to scan the surface of the screen 2, the beam of light being directed onto the photoelectric cell by a lens 5. The output of the photoelectric cell 4 is applied to a control circuit 6 which controls the intensity of the scanning beam of the cathode-ray tube 3. This circuit operates in such a manner that the intensity of the spot on the tube 3 increases as the scanning beam passes over a darkened portion of the metachromic material.

In operation, the projection of a symbolic display from the tube 1 onto the metachromic screen 2 causes the latter to darken in area corresponding to the lighter parts of the projected image. As the projected image is scanned by the flying-spot scanner the light received by the photoelectric element decreases as the scanning beam passed over such a darkened area of the screen. The control circuit causes the intensity of the scanning spot to increase in an attempt to maintain constant illumination of the photoelectric cell, and the intensity of the scanning beam is reduced as the beam leaves the darkened portion of the screen. The brighter parts of the scan tend to "rewrite" the original image and increases the opacity of the screen which will have faded since the initial image was produced. If the flying-spot scan occurs at a high rate compared with the original display scan, then the display is maintained between successive scans on the picture tube 1. Due to the operation of the control circuit a picture will in fact appear on the face of the scanning tube as the intensity of the scanning beam is modulated. Since the image on the metachromic screen is a "negative" image of the original display, the image on the scanning tube will be a positive copy of the original symbolic display.

It is possible to produce a high intensity display from the output of the flying-spot scanner, which will provide a television-type picture on a cathode-ray tube. A number of such displays may be produced simultaneously, Alternatively a high intensity display may be produced by illuminating the metachromic screen with visible light having the extreme blue and red components removed. Such a display may, of course, only be viewed in one place. In the arrangement shown in the drawing the screen 2 may be viewed or illuminated from either side.

The control circuit, which is basically an inverting circuit, may be arranged to produce different effects, dependent upon the intensity of the scanning beam. For example it is possible to use a very bright scanning beam so that the trace on the metachromic screen becomes increasingly more opaque. In such a case any projected image will remain until such time as the scanning beam is removed or reduced in intensity. Alternatively the intensity of the scanning beam may be such as to only partially compensate for the natural decay in opacity of the darkened portions of the screen. In such a case the persistance of the image will be increased considerably. It is very difficult in practice to compensate for the decay in opacity exactly, since some parts of the trace may be more opaque than others.

It is possible to produce the projected symbolic image on the metachromic screen from more than one source. For example a stationary map or grid may be projected either from a cathode-ray tube or from a steady light source. Similarly, moving parts of the image may be provided from more than one cathode-ray tube.

In practice the optical system used will be more complex than that shown since it is necessary to take care to prevent distortion of either the projected image or the scanning raster.

As already stated it is possible to produce part of the image projected on the metachromic screen by means other than a cathode-ray tube. The use of a flying-spot scanner to intensify the metachromic image is equally applicable in such cases.

If it is required to remove the image on the metachromic material more rapidly than by the natural decay, the material may be irradiated with infra-red radiation from a suitable source. Alternatively, to erase a portion only of the image the scan of the flying-spot scanner may be wholly or partially interrupted.

What we claim is:

1. An information display system, comprising a screen of short-persistence metachromic material, means for projecting an image onto said screen in the form of a symbolic display, a flying-spot scanner for repeatedly scanning the image on the screen, said flying-spot scanner comprising a cathode-ray tube arranged to emit light of wave lengths which cause said screen to become opaque and a light-responsive device located on opposite sides of the screen and capable of repeatedly scanning the image on the screen, and a control circuit having an input electrically connected to the light-responsive device and an output electrically connected to the cathode ray tube of the flying-spot scanner, said control circuit being operable to modulate light emitted by the cathode-ray tube so that the intensity of the light varies in direct proportion to opacity of the metachromic screen.

2. An information display system as claimed in claim 1 in which the means for projecting an image onto the metachromic screen comprise a plurality of ligfht sources, each producing a part of said image.

3. An information display system as claimed in claim 2 in which at least one of said light sources produces light of low intensity.

4. An information display system as claimed in claim 2 in which at least one of said light sources is a cathode-ray tube.

References Cited
UNITED STATES PATENTS

| | | | |
|---|---|---|---|
| 2,521,635 | 9/1950 | Kornei | 315—10 X |
| 2,798,901 | 7/1957 | Harter | 315—10 X |
| 2,969,474 | 1/1961 | Roberts et al. | 313—92 |
| 3,085,469 | 4/1963 | Carlson | 88—106 |
| 3,134,297 | 5/1964 | Carlson et al. | 88—106 |
| 3,148,281 | 9/1964 | Fyler | 250—217 |
| 3,160,504 | 12/1964 | Montani | 88—106 |
| 3,183,766 | 5/1965 | Takasaka et al. | 178—7.3 |
| 3,185,026 | 5/1965 | Carlson et al. | 350—160 X |
| 3,225,138 | 12/1965 | Montani | 178—7.2 |
| 3,238,841 | 3/1966 | Bjelland et al. | 88—106 |
| 3,249,691 | 5/1966 | Bigelow | 178—6.8 |
| 3,253,497 | 5/1966 | Dreyer | 178—7.87 X |
| 3,277,241 | 10/1966 | Spencer | 178—7.87 X |
| 3,278,319 | 10/1966 | Cohen | 350—160 X |

JOHN W. CALDWELL, *Acting Primary Examiner.*

R. L. RICHARDSON, *Assistant Examiner.*